United States Patent [19]

Wijnberg

[11] Patent Number: 5,150,443
[45] Date of Patent: Sep. 22, 1992

[54] CABLE FOR DATA TRANSMISSION AND METHOD FOR MANUFACTURING THE SAME

[75] Inventor: Willem A. Wijnberg, Houston, Tex.

[73] Assignee: Schlumberger Techonolgy Corporation, Houston, Tex.

[21] Appl. No.: 567,837

[22] Filed: Aug. 14, 1990

[51] Int. Cl.[5] ............................................. G02B 6/44
[52] U.S. Cl. ..................................... 385/107; 385/101; 385/108; 174/106 R; 174/108
[58] Field of Search ................. 350/96.2, 96.21, 96.22, 350/96.23; 174/106 R, 108; 385/100, 101, 107, 108, 109, 112, 113

[56] References Cited

U.S. PATENT DOCUMENTS

| | | | |
|---|---|---|---|
| 2,725,713 | 12/1955 | Blanchard | 350/96.23 |
| 3,106,815 | 10/1963 | Nance et al. | 350/96.23 |
| 3,137,988 | 6/1964 | Bowers et al. | 350/96.23 |
| 3,679,812 | 7/1972 | Owens | 350/96.23 |
| 3,800,066 | 3/1974 | Whitfill, Jr. et al. | 174/108 |
| 3,855,468 | 12/1974 | Pitts, Jr. | 250/257 |
| 3,916,685 | 11/1975 | Paap et al. | 73/152 |
| 4,005,168 | 1/1977 | Whitfill, Jr. et al. | 264/103 |
| 4,028,660 | 6/1977 | Pitts, Jr. | 340/18 |
| 4,077,022 | 2/1978 | Pitts, Jr. | 333/1 |
| 4,278,835 | 7/1981 | Jackson | 350/96.23 X |
| 4,522,464 | 6/1985 | Thompson et al. | 350/96.23 |
| 4,523,804 | 6/1985 | Thompson | 350/96.23 |
| 4,606,604 | 8/1986 | Soodak | 350/96.23 |
| 4,675,474 | 6/1987 | Neuroth | 174/102 R |
| 4,675,475 | 6/1987 | Bortner et al. | 174/113 R |
| 4,696,542 | 9/1987 | Thompson | 350/96.23 |
| 4,705,353 | 11/1987 | Wagoner | 350/96.23 |
| 4,780,574 | 10/1988 | Neuroth | 174/105 R |
| 4,952,012 | 8/1990 | Stamnitz | 350/96.23 |
| 5,028,116 | 7/1991 | Bonicel et al. | 350/96.23 |

OTHER PUBLICATIONS

Applicnt's quote dated Dec. 9, 1988.
"Umbilical Cable Design and Selection Criteria", Fred Hartdegen and William Wijnberg, Ocean Industry, Mar. 1985, May 1985, Jun. 1985.
Bid made by the University of Hawaii, Nov., 1988.

*Primary Examiner*—John D. Lee
*Assistant Examiner*—Phan T. Heartney
*Attorney, Agent, or Firm*—Henry N. Garrana; John H. Bouchard

[57] ABSTRACT

A cable for data transmission comprising a core comprising at least one energy transmission line; a jacket enclosing the core; armor strands wound around the jacket; and an embedding elastic structure, surrounding the jacket and designed to receive the armor strands. The cable may be manufactured as follows: (1) surrounding the core with a jacket; (2) surrounding the jacket with an embedding layer of curable but non cured thermosetting material; (3) enclosing the thermosetting layer with helically wound armor strands, in such a way that complementary grooves are generated in the embedding layer; and (4) subjecting the cable to heat in order to cure the thermosetting material of the embedding structure.

20 Claims, 3 Drawing Sheets

CABLE FOR DATA TRANSMISSION AND METHOD FOR MANUFACTURING THE SAME

BACKGROUND OF THE INVENTION

1. Field of the invention

This invention relates to a method and apparatus for processing cables to achieve desired physical characteristics, in particular reduced longitudinal stretch.

2. The prior art

In many applications, it is important that the physical length of a cable be fixed or if the length changes, such changes be determinable. This is significant, for example, in well logging where a sonde is lowered into a well on an electric cable and the depth of the sonde is determined by measuring the amount of cable payed out. Usually, the length of cable in such an application changes with temperature and tension on cable, but these length changes can be calculated from known temperature and tension data relationships. However, if the cable is irreversibly deformed in use (as by a permanent or plastic elongation), the cable length has changed and the precise depth of a logging sonde in the well at the time of use is not accurately determined. Moreover, if the cable length is determined by markers along the length of the cable, these markers are made inaccurate by permanent cable elongation.

It has been proposed, in order to solve the problem of irreversible deformation of a cable, to subject the entire length of the cable before use to a "hot pre-stressing" operation. In this operation, the cable is subjected to simultaneous tension and heat in such a manner that the inherent irreversible (or plastic) deformation characteristics are substantially removed; the only deformation characteristics which are supposed to remain at that point are the elastic deformation characteristics. Nevertheless, this operation does not fully overcome the above mentioned difficulties.

The kind of cables the invention is directed to generally comprises a core surrounded by a jacket, made e.g. of insulating material. The jacket is itself enclosed by a first and a second layer of armor strands. The core may include electrical conductors and/or optic fibers and the usual electrical insulating and mechanical protecting sheaths immediately surrounding the electrical conductors or the optic fibers. Such known cables are described e.g. in A. Blanchard U.S. Pat. No. 2,725,713; Nance et al. U.S. Pat. No. 3,106,815; W.E. Bowers et al. U.S. Pat. No. 3,137,988; and Whitfill, Jr. et al. U.S. Pat. No. 3,800,066. All these patents are assigned to predecessors in right or subsidiary of the assignee of the present application, and are incorporated herein by reference. In a first embodiment, as shown in the article "Umbilical Cable Design and Selection Criteria" from Fred Hartdegen and Willem Wijnberg, published in Ocean Industry, Mar. 1985, May 1985 and Jun. 1985, the jacket disposed between the core and the armor strands is made of a thermoplastic material, such as e.g. Polyethylene or Ethylene Propylene Copolymer (EPC). This thermoplastic material is such that it allows, upon tension applied to the cable during use, the armor strands to embed into the jacket material. Especially, the armor strands lie in grooves generated on the periphery of the jacket. The grooves, which remain after release of the tension, help to maintain the armor strands in a close relationship with the jacket/core. However, upon tension applied to the cable, the jacket thermoplastic material is usually squeezed and, after having filled in the interstices between the armor strands, may even ooze out between the armor strands. As a consequence, the armor strands embed in the jacket deeper and deeper from one utilization to the next one, and thus the cable becomes longer and longer, in a permanent way. This plastic elongation of the cable goes on until the armor strands are in contact one with another. At that point, the wear of the cable increases rapidly.

One has suggested to remedy this situation by making the jacket out of a thermosetting material, such as a cured rubber e.g. acrylonitrile butadiene rubber, as shown in the above referred to patents. At rest, the armor strands lie on the cylindrical surface of the jacket. Upon application of tension on the cable, the cured rubber softness allows the armor strands to embed in grooves generated at the surface of the jacket, while its elastic properties make the embedding grooves disappear upon release of the tension.

The rubber jacket cable, although it seems to obviate the oozing phenomenon above referred to, shows some drawbacks.

First, the rubber jacket cable usually stretches longitudinally, when subjected to tension, to a bigger amount than the plastic jacket cable, since the rubber fills in the interstices between the armor strands, thus allowing the cable to stretch. Second, the rubber is a material which is not easy to handle and to process, and which also presents some limitations with respect to temperature resistance and aging.

Accordingly, there is a need, especially in a hostile environment such as in a borehole, for a cable showing no permanent (plastic) stretch and only limited elastic stretch.

SUMMARY OF THE INVENTION

Accordingly, an object of the present invention is to provide a cable showing a drastically reduced elastic longitudinal deformation.

These and other objects are attained according to the invention, with a cable comprising:

a core comprising at least one energy transmission line;

a jacket enclosing the core;

armoring means including at least one set of strands helically wound around the jacket; and an embedding elastic structure, surrounding the jacket and designed to receive the armor strands.

In a preferred embodiment, the embedding structure includes a layer of curable thermosetting material.

By way of example, the jacket is made of thermoplastic material, such as Polyethylene, Ethylene Propylene Copolymer (EPC), TEFLON (Trademark of DuPont, Inc.) or Polyurethane.

The curable thermosetting material of the embedding layer is e.g. butyl rubber, neoprene, nitrile or Hypalon (Trademark of DuPont, Inc.).

The invention also relates to a method for manufacturing a cable comprising:

surrounding a core including at least one energy transmission line with a jacket;

surrounding the jacket with an embedding layer of elastic and curable but non cured thermosetting material;

enclosing the embedding layer with armor strands, in such a way that complementary grooves are generated on the surface of the embedding layer;

subjecting the cable, thus formed, to heat in order to cure the thermosetting material of the embedding layer.

More particularly, the thickness of the embedding layer measured in the radial direction, prior to the cure step, is typically comprised between 1% and 75%, and preferably between and 10%, of the jacket thickness.

The invention may be better understood from the following detailed description of typical embodiments, taken in conjunction with the accompanying drawings, in which:

DETAILED DESCRIPTION

Figure 1:
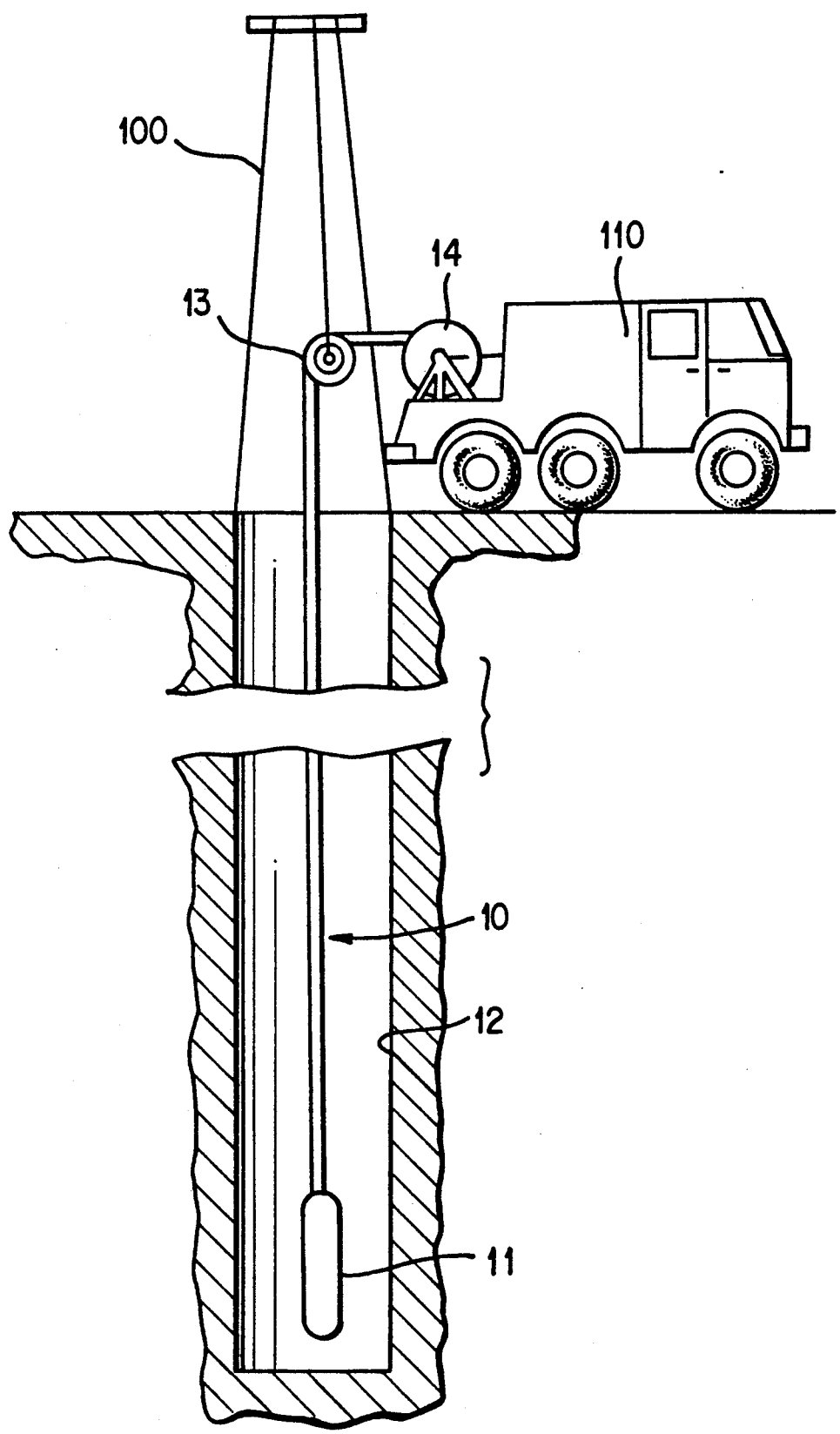
FIG. 1 illustrates a cable constructed according to the invention, lowered into a bore hole drilled into the earth.

An example of a cable according to the invention is depicted in FIG. 1. A cable 10 is shown supporting a well logging sonde 11, for example, in a bore hole 12 drilled into the earth. The cable 10 passes over a pulley 13 attached to an structure 100 erected on the surface. The upper end of the cable is secured to conventional winch 14 by means of which the sonde 11 may be lowered into and withdrawn from the well 12. The winch 14 may be mounted on a truck 110 incorporating the usual electronic devices for the transmission, processing, display or other like processing steps of the data issued from the sonde 11, as well as for the control of the operation of the sonde 11. It will be noted that the drawing of FIG. 1 has not been drawn to scale.

Figure 2:
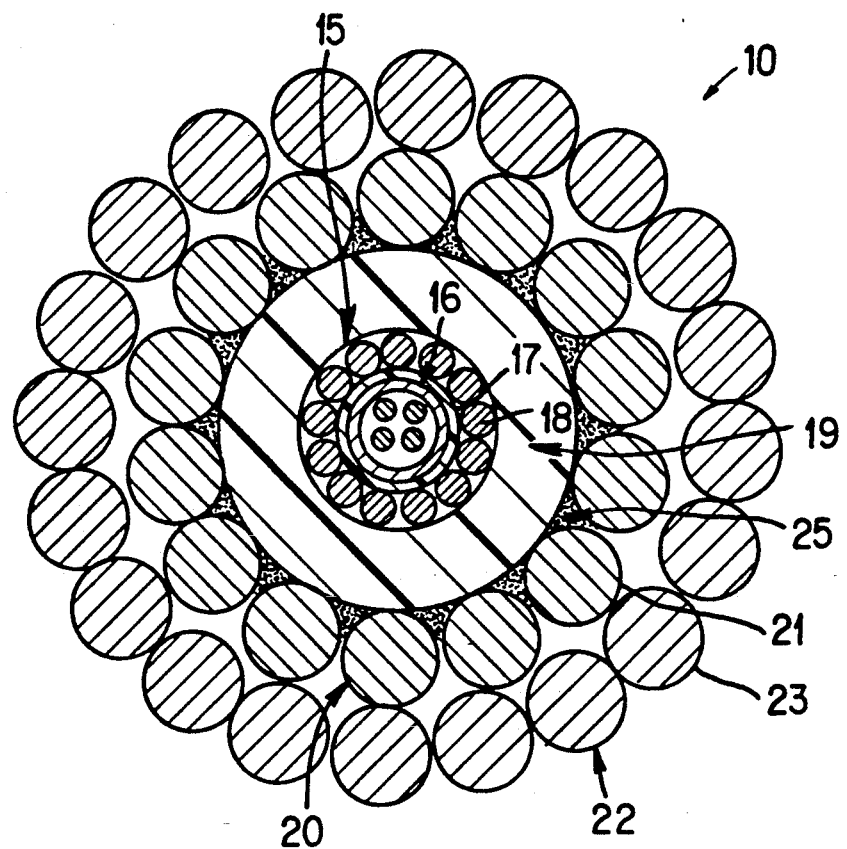
FIG. 2 is a cross section view of an example of a cable according to the invention.

As shown in greater detail in FIG. 2, which is a cross section view of an example of embodiment of the cable, the cable 10 comprises a core 15 which includes a transmission line for the transmission of the data and operating commands from and to the sonde. The transmission line may be of the optical, electro-optical or electrical type, and may comprise e.g. either several optical fibers or several electrical conductors, disposed in a steel tube 16. The tube 16 may be surrounded by a layer of synthetic nonwoven material 17, such as the one known under the trademark Nylon. A set of conducting wires 18, e.g. of copper, may surround the synthetic material layer 17. The copper wires 18 are enclosed in a jacket 19 of any suitable material, such as a thermoplastic material, more particularly polyethylene (PE), ethylene propylene copolymer (EPC), polyurethane (PU), Teflon* (FEP*, PFA*), Tefzel*; * indicates a trademark of DuPont, Inc. The jacket may alternatively be made of a thermosetting material.

Surrounding the jacket 19 is an inner layer of armor 20 comprising a plurality of metal strands 21 which are preferably preformed and which are wound in a helix about the jacket/core. The pitch of the strands 21 substantially covers the jacket 19. While fourteen strands 21 are shown in FIG. 2, the exact number employed in any case will depend upon the diameter, strength and lay desired. In electrical logging operations, the cables employed may have up to twenty-four strands in the inner layer of armor 20. Wound on top of the inner armor layer 20 is an outer layer of armor 22 comprising a plurality of metal strands 23 wound in the opposite direction to the inner strands 21. The outer armor 22 includes in the example shown twenty strands 23, but may also have as many as twenty-four.

For illustration purpose, the cable shown on FIG. 2 may have the following dimensions, "OD" standing for outer diameter:

| Core OD | 0.097" | (2.46 mm) |
| Jacket OD | 0.174" | (4.42 mm) |
| Inner armor strands diameter | 0.049" | (1.24 mm) |
| Outer armor strands diameter | 0.049" | (1.24 mm) |

According to the invention, an embedding layer 25 is provided for the inner armor strands 20, and which is disposed between the jacket 19 and the inner armor 20. The embedding layer 25 is made of an elastic and curable thermosetting material, such as e.g. butyl rubber, neoprene, nitrile or Hypalon (Trademark of DuPont, Inc.). The material forming the embedding layer 25 is such that, when the cable is subjected to tension, grooves are generated in the material. Such grooves are complementary to the inner armor strands 21, so that the thermosetting material of the embedding layer fills in the interstices between the inner armor strands. Thus, no empty space is left between the jacket 19 and the inner armor 20. The grooves remain after release of the tension, as will be explained further in connection with the description of the method according to the invention for the manufacturing of the cable.

Figure 3:
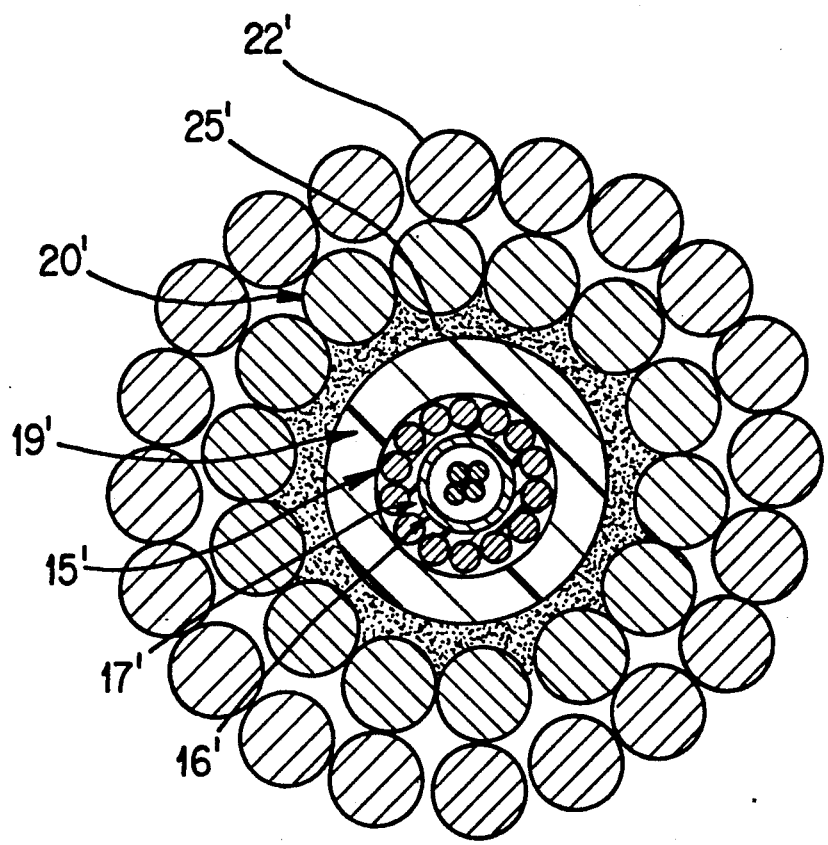
FIG. 3 is a view of an alternate embodiment of the cable according to the invention.

On FIG. 3 is represented an alternate embodiment of the cable wherein the elements which are similar to elements in FIG. 2 bear the same reference numerals modified with a "prime" superscript. The plastic jacket 19' has an outer diameter of 0.159" (4.04 mm), i.e. is smaller than the OD of the implementation of FIG. 2. The embedding layer 25' of FIG. 3 is thicker than the one shown on FIG. 2, and has a thickness of 0.02" (0.58 mm).

The cable may advantageously be manufactured according to the following method which is part of the invention.

The first step of the method is the manufacturing of the core 15, as it is known in the art, e.g. according to the teaching of the prior patents hereabove referred to. The core is then enclosed in a thermoplastic jacket 19, e.g. by extrusion of the jacket. On the periphery of the jacket 19 is disposed the embedding layer 25 of curable but non cured thermosetting material. The curable thermosetting layer 25 may be disposed either by extrusion or by means of a tape (in either helical or longitudinal wrap). Then, the inner armor strands 21 are helically wound on the embedding layer 25, on which are wound, in an opposite direction, the outer armor strands 23. This results in the formation of grooves in the soft embedding layer. The shape of the grooves is complementary to the inner armor strands 21, as shown in FIGS. 2 and 3. The armor strands, while being applied on the embedding layer, typically are subjected to a certain amount of "back tension" due to the fact the spools containing the strands are restrained from free wheeling. A certain tension thus results in the strands to overcome the friction and pull the strands off the spool. Thus the armor strands apply radial pressure on the embedding layer 25. The radial thickness of the embedding layer is such that the curable thermosetting material fills in, during the armoring process, the interstices between the inner armor strands 21 and between the same and the plastic jacket 19. The next step includes subjecting the cable to the right amount of heat in order to cure the curable thermosetting material forming the embedding layer 25. This allows to fix in a permanent way the shape of the grooves. The amount of thermosetting material could be such that, once the interstices have been filled in, an annulus of cured material remains between the outer surface of the plastic jacket 19 and the bottom of the inner armor strands 21. This remaining material annulus could be relatively thin, as shown in FIG. 2, e.g. of a thickness of 0.004" (0.1 mm). It could alternatively be relatively thick, as shown in FIG. 3, e.g. having a thickness of 0.02" (0.58 mm).

The cable according to the invention presents a much reduced longitudinal elastic stretch compared to cables of the prior art.

Since the cured thermosetting material of the embedding layer 25 does not "cold flow" (or ooze) under pressure, the radial movement of the armor strands is substantially reduced, thereby eliminating most of the plastic of permanent stretch of the cable. The inner armor strands 21 move back to their initial radial position upon release of the tension. However, the tension applied to the cable induces a very limited radial move of the armor strands since the gaps or interstices between the armor strands are already filled in with the embedding layer (due to the presence of permanent grooves). On the other hand, the presence of the jacket 19 limits the amount of elastic embedding layer able to be compressed by the armor strands 21. Furthermore, since the armor strands are not in contact with the plastic jacket, the cable of the invention is not subjected to the detrimental oozing phenomenon of the prior art cables.

Although the invention has been described and illustrated with reference to specific embodiments thereof, it will be understood by those skilled in the art that various modifications and variations may be made without departing from the invention concepts disclosed.

By way of example, the cable of the invention could also be used as a communication cable to be laid on the bottom of the ocean, or as a cable designed to pull a set of instruments through the ocean by means of a vessel.

What is claimed is:

1. A cable comprising:
   a core having at least one energy transmission line;
   a jacket enclosing said core;
   armor means helically surrounding said jacket, said armor means including at least one set of strands; and
   an embedding elastic structure comprising a cured, thermosetting material surrounding said jacket and molded for receiving said armor strands.

2. The cable according to claim 1 wherein said thermosetting material is chosen from the group consisting of butyl rubber, neoprene and nitrile.

3. The cable according to claim 1 wherein said armor means includes a second set of armor strands helically wound around, and in the opposite direction to, said first set.

4. The cable according to claim 1 wherein said embedding structure has a thickness such that it at least fills in the interstices between said first set of armor strands and said jacket.

5. The cable according to claim 1 wherein the thickness, measured in the radial direction, of said embedding structure is between about 1% and about 75% of said jacket thickness.

6. The cable according to claim 1 wherein the thickness, measured in the radial direction, of said embedding structure is between about 1% and about 10% of said jacket thickness.

7. The cable according to claim 1 wherein said energy transmission line includes a set of electrical conductors.

8. The cable according to claim 1 wherein said energy transmission line includes a set of optical fibers.

9. The cable according to claim 1 wherein said jacket is made of a thermoplastic material.

10. The cable according to claim 9 wherein said thermoplastic material is selected from the group consisting of polyurethane, polyethylene and ethylene propylene copolymer.

11. The cable according to claim 1 wherein said jacket is made of a thermosetting material.

12. A method for manufacturing a cable comprising the steps of:
    providing a core, said core including at least one energy transmission line;
    surrounding said core with a jacket;
    surrounding said jacket with an embedding layer of elastic and curable, but non-cured, thermosetting material;
    enclosing said embedding layer with helically-wound armor means, said armor means including at least one set of armor strands, in such a way that complementary grooves are formed in said embedding layer for receiving said armor strands; and
    curing said thermosetting material of said embedding layer.

13. The method of claim 12 wherein said curing step is performed by applying heat.

14. The method of claim 12 wherein the thickness, measured in the radial direction prior to the cure step, of said embedding layer is between about 1% and about 75% of said jacket thickness.

15. The method according to claim 12 wherein the thickness, measured in the radial direction prior to the cure step, of said embedding layer is between about 1% and about 10% of said jacket thickness.

16. The method according to claim 12 wherein said energy transmission line includes a set of electrical conductors.

17. The method according to claim 12 wherein said energy transmission line includes a set of optical fibers.

18. The method according to claim 12 wherein said armor means further includes a second set of armor strands helically surrounding said first set, said second and first sets being wound in opposite directions.

19. The method according to claim 12 wherein said embedding layer is placed on said jacket by extrusion.

20. The method according to claim 12 wherein said embedding layer is placed on said jacket by winding a tape of thermosetting material on said jacket.

* * * * *